(12) United States Patent
Lu et al.

(10) Patent No.: US 9,621,674 B2
(45) Date of Patent: Apr. 11, 2017

(54) METHOD AND APPARATUS FOR ASSOCIATING ONLINE ACCOUNTS

(71) Applicant: TENCENT TECHNOLOGY (SHENZHEN) COMPANY LIMITED, Shenzhen (CN)

(72) Inventors: Yi Lu, Shenzhen (CN); Qian Zhang, Shenzhen (CN); Tathei Wong, Shenzhen (CN); Zehan She, Shenzhen (CN); Tingjun Hong, Shenzhen (CN); Jin Fang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/114,194

(22) PCT Filed: Jun. 15, 2015

(86) PCT No.: PCT/CN2015/081461
§ 371 (c)(1),
(2) Date: Jul. 26, 2016

(87) PCT Pub. No.: WO2015/192751
PCT Pub. Date: Dec. 23, 2015

(65) Prior Publication Data
US 2016/0381173 A1   Dec. 29, 2016

(30) Foreign Application Priority Data
Jun. 18, 2014   (CN) .......................... 2014 1 0274152

(51) Int. Cl.
*G06F 15/16* (2006.01)
*H04L 29/08* (2006.01)
(Continued)

(52) U.S. Cl.
CPC ............ *H04L 67/306* (2013.01); *H04L 51/32* (2013.01); *H04L 67/1097* (2013.01); *H04W 4/008* (2013.01); *H04W 12/06* (2013.01)

(58) Field of Classification Search
USPC ........................................................ 709/206
See application file for complete search history.

(56) References Cited

U.S. PATENT DOCUMENTS 8,249,985 B2   8/2012   Giordano et al.
2013/0117276 A1   5/2013   Hedditch et al.

FOREIGN PATENT DOCUMENTS

CN   101030311 A   9/2007
CN   101884051 A   11/2010
(Continued)

OTHER PUBLICATIONS

International Search Report and Written Opinion, International Application No. PCT/CN2015/081461 mailed Aug. 26, 2015.

*Primary Examiner* — Hee Soo Kim
(74) *Attorney, Agent, or Firm* — Marshall, Gerstein & Borun LLP

(57) ABSTRACT

A method for associating online accounts includes: sending a device identification of a public device corresponding to a public online account that includes at least a first online account and second online account information corresponding to a second online account to a server, so that the server associates the second online account with the first online account in the public online account corresponding to the device identification, to obtain a public online account including the first online account and the second online account.

14 Claims, 10 Drawing Sheets

(51) Int. Cl.
*H04L 12/58* (2006.01)
*H04W 4/00* (2009.01)
*H04W 12/06* (2009.01)

(56) References Cited

FOREIGN PATENT DOCUMENTS

| CN | 102932341 A | 2/2013 |
| CN | 103118031 A | 5/2013 |

| Select a family role | |
|---|---|
| Father | ● |
| Mother | ○ |
| Paternal grandfather | ○ |
| Paternal grandmother | ○ |
| Maternal grandfather | ○ |
| maternal grandmother | ○ |
| Others | ○ |
| Cancel | Confirm |

(1)

| Select the child's birthday | | |
|---|---|---|
| ▲ | ▲ | ▲ |
| 2000 | 01 | 16 |
| 2001 Year | 02 Month | 17 Day |
| 2000 | 03 | 18 |
| ▼ | ▼ | ▼ |
| Cancel | | Confirm |

(2)

| Select the child's gender | |
|---|---|
| Boy | ● |
| Girl | ○ |
| Cancel | Confirm |

(3)

| Frequently-used email |
|---|
| [              ] |
| Cancel        Confirm |

METHOD AND APPARATUS FOR ASSOCIATING ONLINE ACCOUNTS

FIELD OF THE TECHNOLOGY

The present disclosure relates to the field of information technologies, and in particular, to a method and an apparatus for associating online accounts.

BACKGROUND OF THE DISCLOSURE

With increasingly development of information technologies, more and more people begin to use online accounts. For example, messages are received or sent by using online accounts. If a plurality of online accounts is associated to from a public online account including the plurality of online accounts, each online account in the public online account may share information in the public online account, so as to facilitate information sharing. Therefore, how to associate a plurality of online accounts into one public online account becomes an issue of concern.

SUMMARY

In a first aspect, provided is a method for associating online accounts, including:

acquiring a device identification of a public device that has established a connection, the public device being a device that has registered on a server, and the public device being corresponding to a public online account including at least a first online account;

acquiring second online account information corresponding to a logged-in second online account; and sending the device identification and the second online account information to the server, so that the server associates the second online account with the first online account in the public online account corresponding to the device identification, to obtain a public online account including the first online account and the second online account.

In a second aspect, provided is an apparatus for associating online accounts, including:

a first acquiring module, configured to acquire a device identification of a public device that has established a connection, the public device being a device that has registered on a server, and the public device being corresponding to a public online account including at least a first online account;

a second acquiring module, configured to acquire second online account information corresponding to a logged-in second online account; and a first sending module, configured to send the device identification and the second online account information to the server, so that the server associates the second online account with the first online account in the public online account corresponding to the device identification, to obtain a public online account including the first online account and the second online account.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

FIG. 9 is a schematic diagram of information modification interfaces provided in another embodiment of the present invention;

DESCRIPTION OF EMBODIMENTS

To make the objectives, technical solutions, and advantages of the present disclosure more comprehensible, embodiments of the present invention are described in detail below with reference to the accompanying drawings.

The method as disclosed as following may be implemented by any appropriate computing device having one or more processors and memory. The computing device, used herein, may refer to any appropriate device with certain computing capabilities (e.g., of controlling media data to be placed at a constant speed), such as a personal computer (PC), a work station computer, a hand-held computing device (tablet), a mobile terminal (a mobile phone or a smart phone), a sever, a network server, a smart terminal, or any other user-side or server-side computing device. The memory includes storage medium, which may further include memory modules, e.g., Read-Only Memory (ROM), Random Access Memory (RAM), and flash memory modules, and mass storages, e.g., CD-ROM, U-disk, removable hard disk, etc, which are all non-transitory storage medium. The storage medium may store computer programs for implementing various processes, when executed by the processors.

Figure 1:
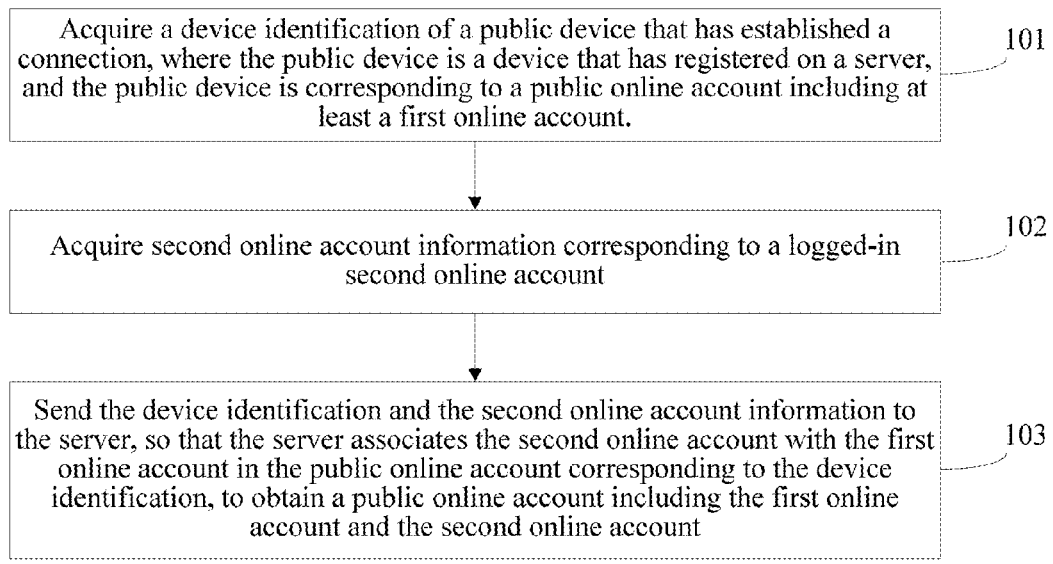
FIG. 1 is a flowchart of a method for associating online accounts provided in an embodiment of the present invention.

Embodiments of the present invention provide a method for associating online accounts. Referring to FIG. 1, the method process includes:

101: Acquire a device identification of a public device that has established a connection, where the public device is a device that has registered on a server, and the public device is corresponding to a public online account including at least a first online account.

As an optional embodiment, before acquiring a device identification of a public device that has established a connection, the method further includes:

establishing the connection with the public device and acquiring a hardware identification of the public device;

sending the hardware identification to the server;

receiving the device identification that is returned by the server according to the hardware identification; and sending the device identification to the public device, so that the public device stores the device identification and finishes registration on the server.

As an optional embodiment, after sending the device identification to the public device, the method further includes:

acquiring first online account information corresponding to a logged-in first online account; and sending the first online account information to the server, so that the server creates the public online account that is corresponding to the device identification and includes the first online account according to the first online account information.

As an optional embodiment, after sending the first online account information to the server, the method further includes:

acquiring device information and public online account information by using the first online account and sending the device information and the public online account information to the server, so that the server stores the public online account information corresponding to the created public online account according to the first online account information, the device information, and the public online account information.

As an optional embodiment, after sending the first online account information to the server, the method further includes:

receiving, in real time, first device use information that is sent by the public device and corresponding to the first online account; and sending the first device use information to the server, so that the server stores the first device use information and generates and updates public device use information according to the first device use information.

102: Acquire second online account information corresponding to a logged-in second online account.

103: Send the device identification and the second online account information to the server, so that the server associates the second online account with the first online account in the public online account corresponding to the device identification, to obtain a public online account including the first online account and the second online account.

After sending the device identification and the second online account information to the server, the method further includes:

receiving the public online account information corresponding to the device identification returned by the server; and acquiring updated public online account information according to the public online account information corresponding to the device identification returned by the server and sending the updated public online account information to the server, so that the server updates the public online account information corresponding to the public online account according to the updated public online account information.

As an optional embodiment, after sending the device identification and the second online account information to the server, the method further includes:

receiving, in real time, second device use information that is sent by the public device and corresponding to the second online account; and sending the second device use information to the server, so that the server stores the second device use information and updates the public device use information according to the second device use information.

In the method provided in the embodiments of the present invention, by acquiring a device identification of a public device corresponding to a public online account including at least a first online account and second online account information corresponding to a logged-in second online account, sending the device identification and the second online account information to the server, and associating, by the server, the second online account with the first online account in the public online account corresponding to the device identification, to obtain a public online account including the first online account and the second online account, the association between the first online account and the second online account is implemented, the process of associating online accounts is simplified, and the efficiency of associating online accounts is improved.

Figure 2:
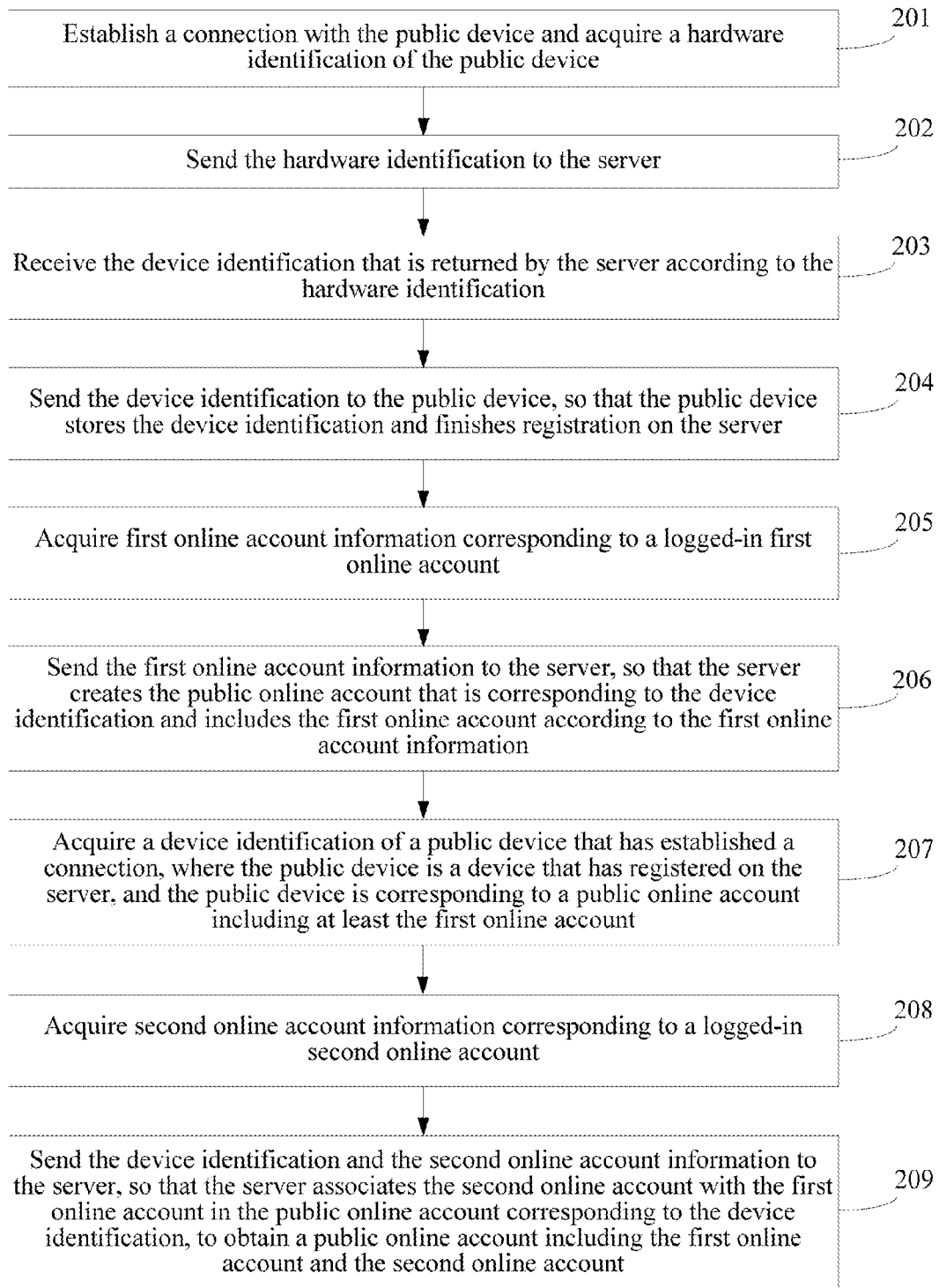
FIG. 2 is a flowchart of a method for associating online accounts provided in another embodiment of the present invention.

The embodiments of the present invention provide a method for associating online accounts. In combination with the content of the embodiments shown in FIG. 1, the method for associating online accounts provided in the embodiments of the present invention being executed by a terminal is used as an example. Referring to FIG. 2, the method process includes:

201: Establish a connection with the public device and acquire a hardware identification of the public device.

The public device includes, but is not limited to, an audio playing device and a lighting device. The method related to the establishment of the connection with the public device is not specifically limited in this embodiment. During specific implementations, the connection with the public device may be established in methods such as Bluetooth and a network.

Figure 3:
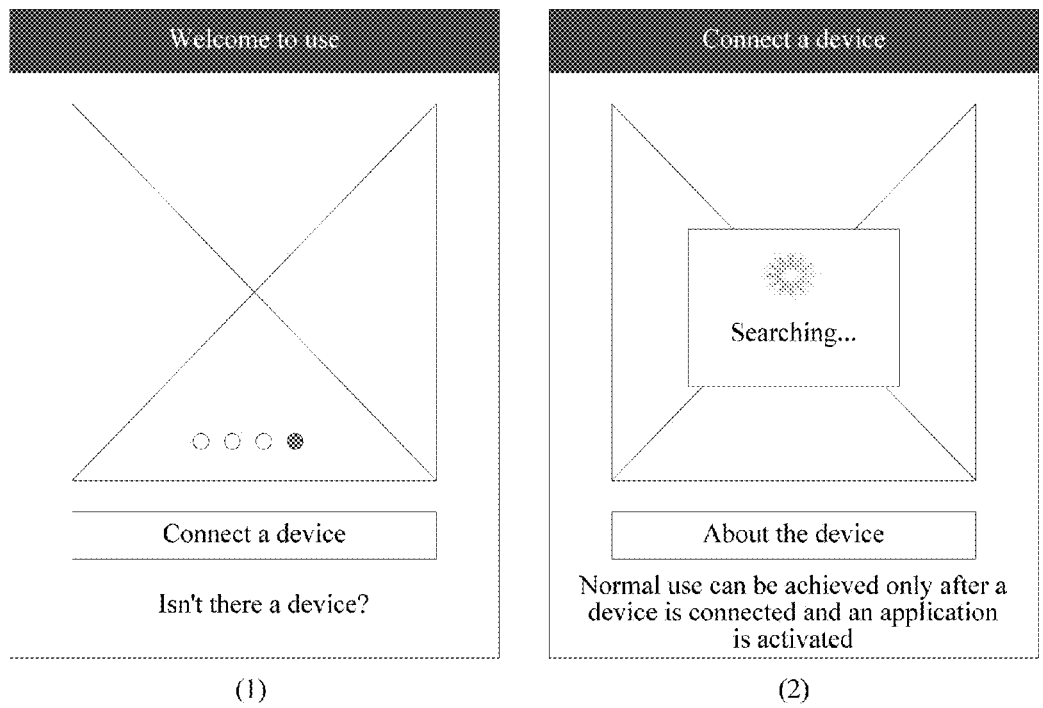
FIG. 3 is a schematic diagram of a connecting interfaces provided in another embodiment of the present invention.
Figure 4:
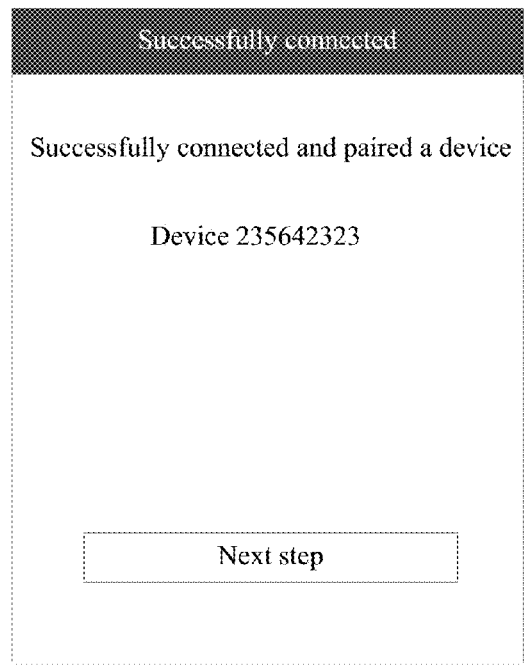
FIG. 4 is a schematic diagram of a prompt interface provided in another embodiment of the present invention.

To facilitate understanding, establishment of a connection between a connecting interface shown in FIG. 3(1) and a public device by using Bluetooth is used as an example for describing. The connecting interface provides a "Connect a device" key. If the "Connect a device" key is detected to be clicked, connectable public devices are searched for, as shown in FIG. 3(2). After a connection with a public device is successfully established, a successful connection prompt interface may be further displayed, as shown in FIG. 4, and the prompt interface displays that information of a successfully-connected public device is a device 235642323, so as to make it convenient for a user to check the connected public device.

In addition, the connecting interface shown in FIG. 3(1) further provides an "Isn't there a device?" identification. The connecting interface shown in FIG. 3(2) further provides an "About the device" key. If the " Isn't there a device?" identification or the "About the device" key is detected to be clicked, an inbuilt browser is started to display an introduction page of connectable public devices.

Further, the hardware identification includes, but is not limited to, a hardware serial number. The hardware serial number may be a media access control (MAC) address. Different public devices are corresponding to different hardware serial numbers. The method related to acquisition of the hardware identification is not specifically limited in this embodiment. During specific implementations, after a connection with a public device is established, an identification is uploaded by the public device and the identification uploaded by the public device is used as an acquired hardware identification.

202: Send the hardware identification to the server.

To enable the public device to be used by another device, the method provided in this embodiment supports a process of registering the public device on the server. During specific implementations, the method provided in this embodiment is sending the hardware identification to the server, so that the server can register the public device according to the hardware identification. For example, if the hardware identification is a MAC address, the MAC address may be sent to the server.

203: Receive the device identification that is returned by the server according to the hardware identification.

To finish the registration of the public device, the server may pre-store a legal hardware identification, so that the server may determine whether a received hardware identification is legal or not. If the received hardware identification is determined to be legal, the device identification is returned and further the terminal may receive the device identification returned by the server according to the hardware identification. The device identification may be a device identification (DID). Different hardware identifications are corresponding to different device identifications.

204: Send the device identification to the public device, so that the public device stores the device identification and finishes registration on the server.

To enable the public device to learn about a registration result, the method provided in this embodiment is sending the device identification to the public device, so that the public device stores the device identification and finishes the registration on the server. The method related to storing of the device identification by the public device is not specifically limited herein. During specific implementations, the device identification may be burned in hardware.

Further, the registration of the public device on the server is completed by using foregoing step 201 to step 204. It should be noted that foregoing step 201 to step 204 are optional steps. That is, after registration of a public device is performed, subsequent steps can be directly executed without again performing registration on the public device when the method for associating online accounts is executed again.

205: Acquire first online account information corresponding to a logged-in first online account.

By using the method provided in this embodiment, when a plurality of online account is associated, all of the associated online accounts compose one public online account. The public online account may be created according to online account information of any associated online account and one public online account is corresponding to one public device, that is, one public online account is corresponding to one device identification. A public online account corresponding to device identification is created according to online account information corresponding to any associated online account. The method provided in this embodiment describes by using creation of a public online account according to first online account information corresponding to a first online account.

Figure 5:
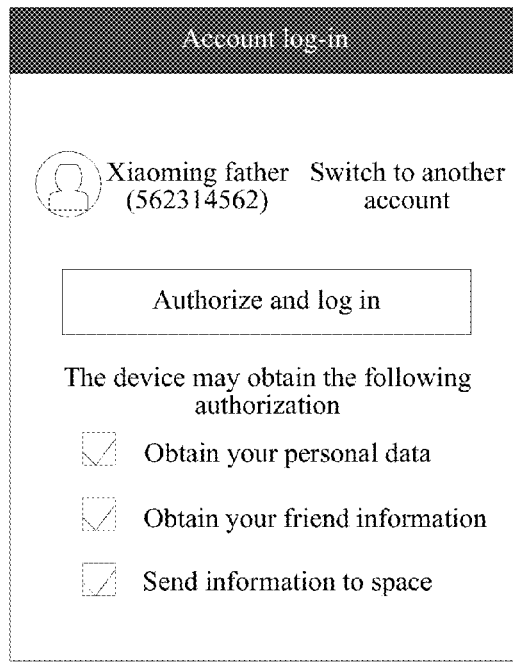
FIG. 5 is a schematic diagram of a log-in interface provided in another embodiment of the present invention.

To facilitate understanding, a log-in interface shown in FIG. 5 is used as an example for describing. The first online account is Xiaming's father (562314562). The log-in interface further provides an "Authorize and log in" key. After the "Authorize and log in" key is detected, online account information corresponding to Xiaming's father (562314562) is acquired. The online account information includes, but is not limited to, an online account name.

In addition, the log-in interface further provides three options, namely, "Obtain your personal data", "Obtain your friend information", and "Send information to space". After any one or a plurality of the options is detected, if the "Authorize and log in" key is detected to be clicked, the terminal is authorized with a right corresponding to the selected option. For example, if after the detection of the selection of "Obtain your personal data", it is detected that the "Authorize and log in" is clicked, the authorized terminal acquires a right to personal data corresponding to Xiaoming father (562314562).

206: Send the first online account information to the server, so that the server creates the public online account that is corresponding to the device identification and includes the first online account according to the first online account information.

The first online account being Xiaoming father (562314562) is used as an example. Online account information corresponding to Xiaoming father (562314562) is sent to the server, so that the server creates a public online account that is corresponding to the device identification and includes the first online account. The public online account may be a family account.

As an optional embodiment, after sending the first online account information to the server, the method further includes, but is not limited to:

acquiring device information and public online account information by using the first online account and sending the device information and the public online account information to the server, so that the server stores the public online account information corresponding to the created public online account according to the first online account information, the device information, and the public online account information.

The device information may be a device name or the like. The public online account information may be a public online account name or information of all online accounts included in the public online account. The content and the acquisition method of the device information and the public online account information are not limited in this embodiment. The server stores the public online account information corresponding to the created public online account according to the first online account information, the device information, and the public online account information, so as to enable any online account included in the public online account that is logged in by using different terminals to check the public online account information corresponding to the public online account.

Figure 6:
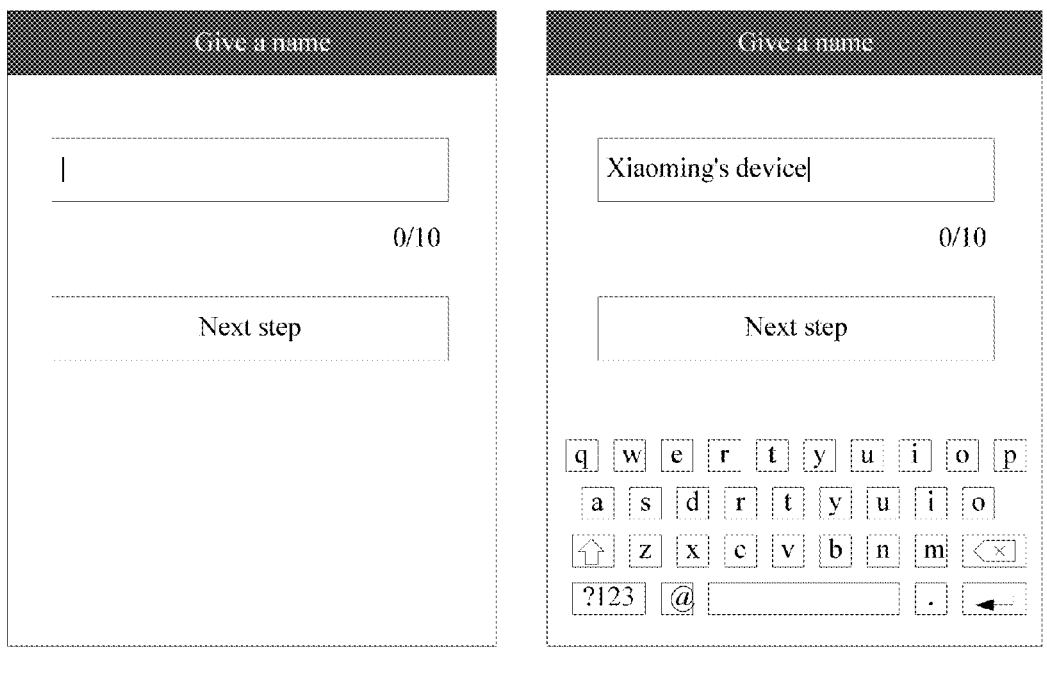
FIG. 6 is a schematic diagram of device information acquisition interfaces provided in another embodiment of the present invention.

To facilitate understanding, a device information acquisition interface shown in FIG. 6(1) is used as an example for describing. The device information acquisition interface provides an input box. A keyboard is displayed after it is detected that the input box is clicked, as shown in FIG. 6(2). It is acquired that the content input in the input box by using the keyboard is Xiaoming's device. After it is detected that a "Next step" key is clicked, the Xiaoming's device is used as acquired device information.

Figures 7, 8:
FIG. 7 is a schematic diagram of public online account information acquisition interfaces provided in another embodiment of the present invention.
FIG. 8 is a schematic diagram of a public online account information display interface provided in another embodiment of the present invention.

A public online account information acquisition interface shown in FIG. 7(1) is used as an example for describing. The public online account information acquisition interface provides four types of public online account information, namely, family role, frequently-used e-mail, child's birthday, and child's gender. It is acquired that the input family role is father, the frequently-used e-mail is 16325623@XX.com, the child's birthday is Dec. 23, 2009, and the child's gender is girl, as shown in FIG. 7(2). After it is detected that a "Finish" key is clicked, the "family role: father, frequently-used e-mail: 16325623@XX.com, child's birthday: Dec. 23, 2009, and child's gender: girl" is used as the public online account information.

Further, after the server stores the public online account information corresponding to the created public online account according to the first online account information, the device information, and the public online account information, by logging in the first online account, the public online account information can be checked and modifiable information in the public online account information can be modified. A public online account information display interface shown in FIG. 8 is used as an example, the public online account information includes: device name: Xiaoming's device, family role: father, frequently-used e-mail: 16325623@XX.com, child's birthday: Dec. 23, 2009, and child's gender: girl and an account, account A, that has bound to the device. The modifiable information shown in FIG. 8 is the family role, the frequently-used e-mail, the child's birthday, and the child's gender. The family role may be modified by using an information modifying interface shown in FIG. 9(1). The information modifying interface provides father, mother, paternal grandfather, paternal grandmother, maternal grandfather, maternal grandmother, and other family roles for selection. A family role that is clicked is detected, and after it is detected that a confirmation key is clicked, the family role is used as the public online account information. The child's birthday may be modified by using an information modifying interface shown in FIG. 9(2). The child's gender may be modified by using an information modifying interface shown in FIG. 9(3). The frequently-used e-mail may be modified by using an information modifying interface shown in FIG. 9(4).

Further, creation of a public online account is completed through foregoing step 205 and step 206. The created public online account includes a first online account and the public online account is corresponding to a public device that has registered on a server.

Figure 10:
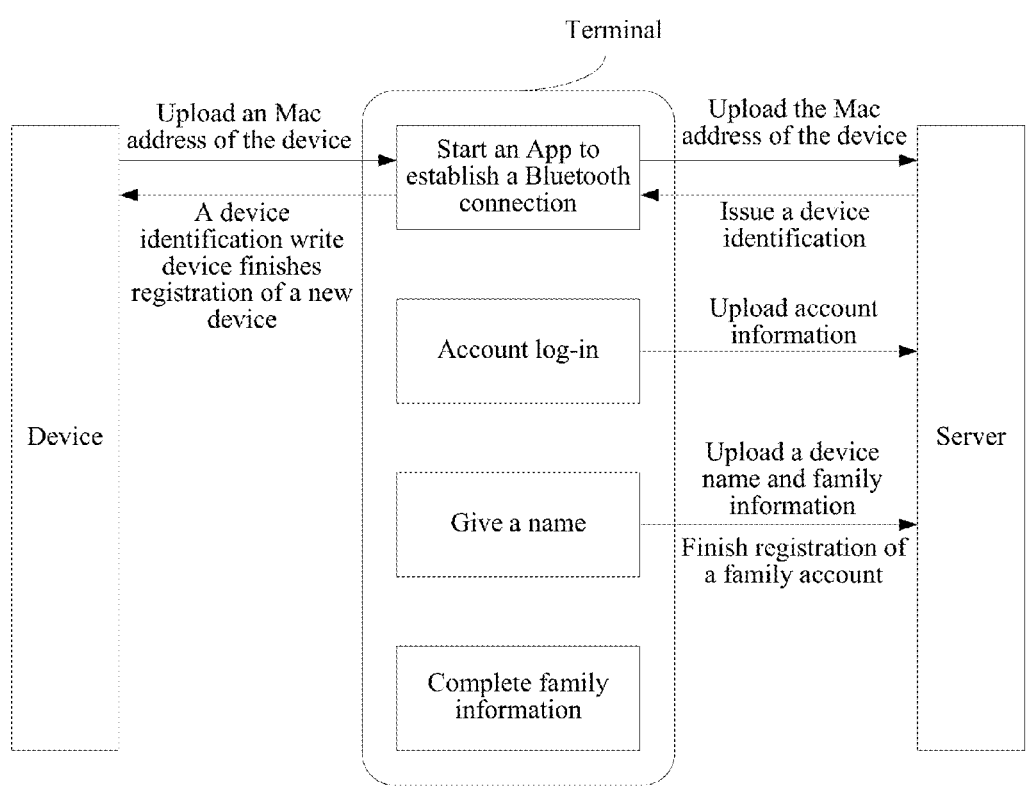
FIG. 10 is a flowchart of registration of a public device and creation of a public online account provided in another embodiment of the present invention.

In addition, referring to the flowchart of registration of a public device and creation of a public online account shown in FIG. 10, step 201 is corresponding to starting an application (App) to establish a Bluetooth connection and upload a device Mac address. Step 202 is corresponding to uploading the device Mac address. Step 203 is corresponding to issuing a device identification. Step 204 is corresponding to completing new device registration by a device identification write device. Step 205 is corresponding to account log-in. step 206 is corresponding to uploading account information, giving a name, uploading a device name or family information, finishing family account registration, and completing family information.

Figure 11:
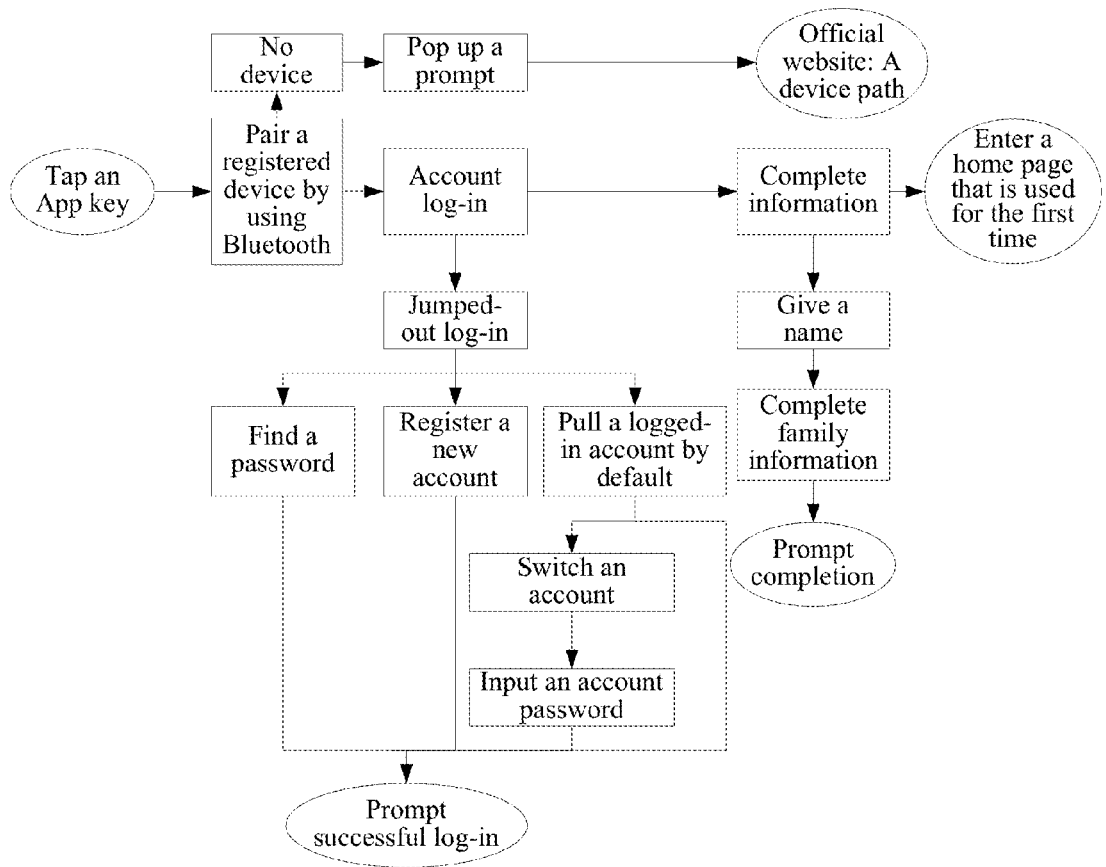
FIG. 11 is a flowchart of human-machine interaction provided in another embodiment of the present invention.

A flowchart of human-machine interaction shown in FIG. 11 may be referred to for a human-machine interaction process in the registration of the public device and creation of the public online account. Step 201 to step 204 are corresponding to tapping an App key, pairing a registered device by using Bluetooth, no device, and popping up a prompt and an official website: a device path. Step 205 is corresponding to account log-in, jumped-out log-in, finding a password, registering a new account, pulling a logged-in account by default, switching an account, inputting an account password, and prompting successful log-in. step 206 is corresponding to completing information, giving a name, completing family information, prompting completion, and entering a home page that is used for the first time.

As an optional embodiment, after sending the first online account information to the server, the method further includes, but is not limited to:

receiving, in real time, first device use information that is sent by the public device and corresponding to the first online account; and sending the first device use information to the server, so that the server stores the first device use information and generates and updates public device use information according to the first device use information.

After a terminal is connected to the public device, information interaction may be performed between the terminal and the public device or the public device may be controlled by using the terminal. If what is logged in is the first online account in the process of information interaction between the terminal and the public device or the control of the device by using the terminal, the device may record first device use information corresponding to the first online account. The device use information may be use time or the like. Further, the server generates and updates public device use information according to the first device use information. The public device use information may be an integral or a grade calculated according to the device use information.

Figure 12:
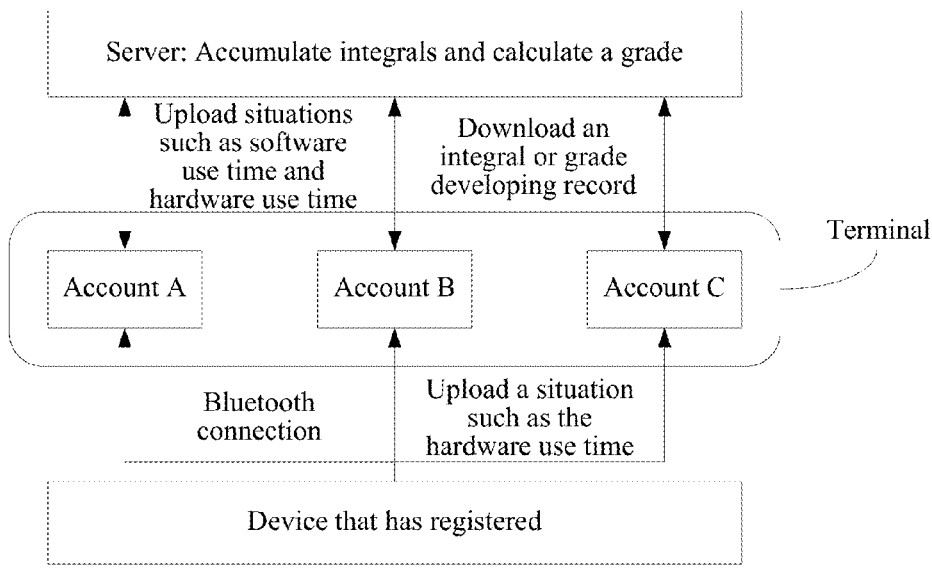
FIG. 12 is a flowchart of generation and update of public device use information provided in another embodiment of the present invention.

To facilitate understanding, the first online account being corresponding to the account A is used as an example for describing. Referring to the flowchart of generating and updating of public device use information shown in FIG. 12, a terminal is connected to a registered device by using Bluetooth, the terminal receives a situation such as a hardware use time that is uploaded by the registered device and corresponding to the account A, that is, the situation such as the hardware use time corresponding to the account A is used as the first device use information corresponding to the first online account. The terminal sends the situation such as the hardware use time corresponding to the account A to the server, so that the server accumulates integrals and calculates a grade according to the situation such as the hardware use time corresponding to the account A, and uses an accumulated integral and the calculated grade as the public device use information. In addition, when sending the situation such as the hardware use time corresponding to the account A to the server, the terminal may further upload a situation such as a software use time corresponding to the account A, so that the server accumulates integrals and calculates a grade according to the situations such as the software use time and the hardware use time corresponding to the account A, and uses an accumulated integral and the calculated grade as the public device use information.

207: Acquire a device identification of a public device that has established a connection, where the public device is a device that has registered on the server, and the public device is corresponding to a public online account including at least the first online account.

Because one public online account is corresponding to one device identification, acquiring of a device identification of a public device that has established a connection is acquiring a public online account corresponding to the device identification. In addition, because the public online account includes at least the first online account, association of online accounts may be performed.

The method related to the acquisition of the device identification of the public device that has established the connection is not specifically limited in this embodiment. During specific implementations, because the public device has stored a device identification during registration on the server, the device identification may be uploaded by the public device, so as to acquire the device identification.

208: Acquire second online account information corresponding to a logged-in second online account.

To associate the second online account with the first online account, the method provided in this embodiment is acquiring the second online account information corresponding to the logged-in second online account. The method for acquiring the second online account information corresponding to the logged-in second online account is the same as the method for acquiring the first online account information corresponding to the logged-in first online account. The method for acquiring the first online account information corresponding to the logged-in first online account in step 205 may be referred for details, which are not described again herein.

209: Send the device identification and the second online account information to the server, so that the server associates the second online account with the first online account in the public online account corresponding to the device identification, to obtain a public online account including the first online account and the second online account.

Because the server has created a public online account that is corresponding to the device identification and includes the first online account according to the first online account information, after the device identification information and the second online account information are sent to the server, the server may associate the second online account with the first online account in the public online account corresponding to the device identification, to obtain the public online account including the first online account and the second online account, so as to implement the association between the first online account and the second online account.

To update the public online account information by using the second online account, after sending the device identification and the second online account information to the server, the method provided in this embodiment further includes, but is not limited to:

receiving the public online account information corresponding to the device identification returned by the server; and acquiring updated public online account information according to the public online account information corresponding to the device identification returned by the server and sending the updated public online account information to the server, so that the server updates the public online account information corresponding to the public online account according to the updated public online account information.

It should be noted that updating may be performed on the public online account by any one of the online accounts included in the public online account. The process of checking the public online account information and modifying the modifiable information in the public online account information in step 206 may be referred to for details of the process of updating the public online account by using the first online account.

Figure 13:
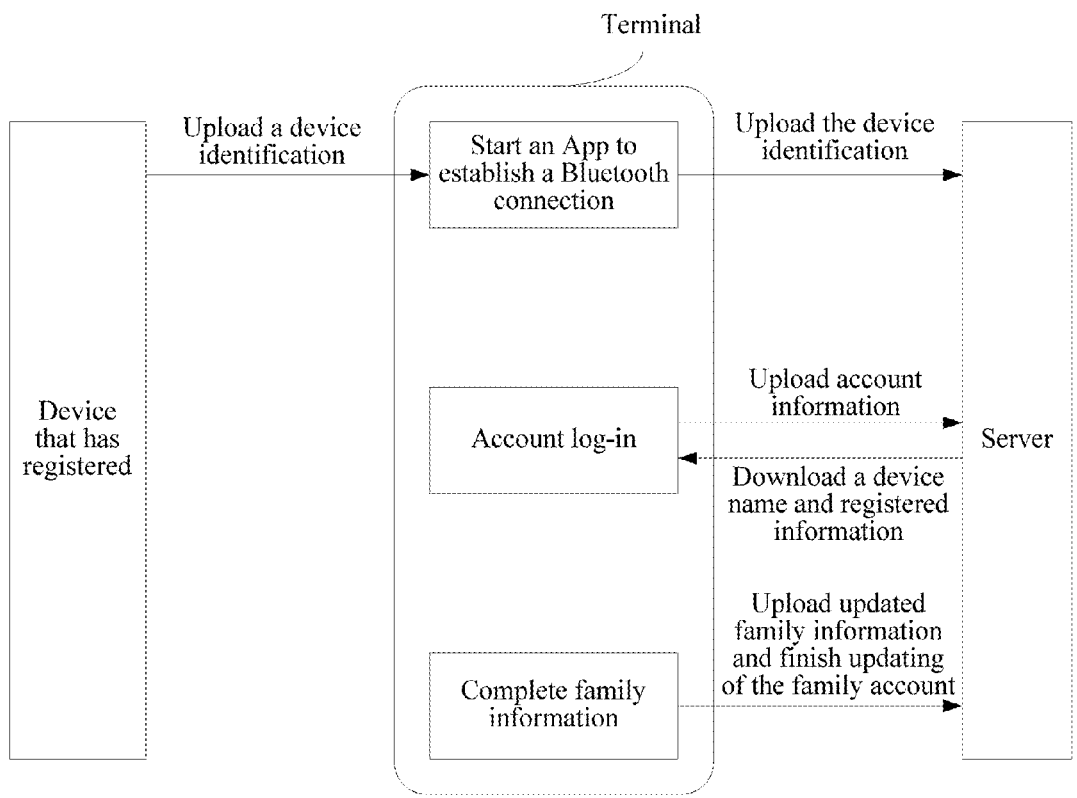
FIG. 13 is a flowchart of association of online accounts provided in another embodiment of the present invention.

In addition, referring to the flowchart of association of online accounts shown in FIG. 13, step 207 is corresponding to starting an App to establish a Bluetooth connection and upload a device identification. Step 208 is corresponding to account log-in. step 209 is corresponding to uploading the device identification, uploading the account information, downloading a device name and registered information, completing family information and uploading updated family information, and finishing update of the family account.

In the method provided in the embodiments of the present invention, by acquiring a device identification of a public device corresponding to a public online account including at least a first online account and second online account information corresponding to a logged-in second online account, sending the device identification and the second online account information to the server, and associating, by the server, the second online account with the first online account in the public online account corresponding to the device identification, to obtain a public online account including the first online account and the second online account, the association between the first online account and the second online account is implemented, the process of associating online accounts is simplified, and the efficiency of associating online accounts is improved.

Figure 14:
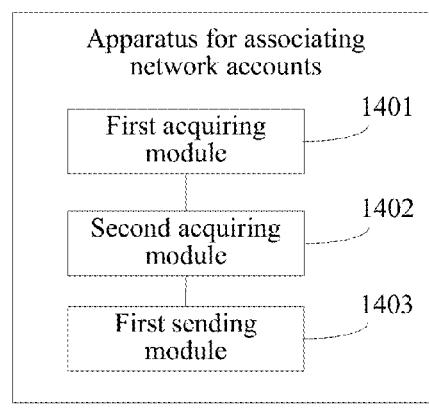
FIG. 14 is a schematic structural diagram of an apparatus for associating online accounts provided in another embodiment of the present invention.

Referring to FIG. 14, the embodiments of the present invention provide an apparatus for associating online accounts. The apparatus is configured to execute the method provided in the embodiments shown in FIG. 1 or FIG. 2. The apparatus includes:

a first acquiring module 1401, configured to acquire a device identification of a public device that has established a connection, the public device being a device that has registered on a server, and the public device being corresponding to a public online account including at least a first online account;

a second acquiring module 1402, configured to acquire second online account information corresponding to a logged-in second online account; and a first sending module 1403, configured to send the device identification and the second online account information to the server, so that the server associates the second online account with the first online account in the public online account corresponding to the device identification, to obtain a public online account including the first online account and the second online account.

As an optional embodiment, the apparatus further includes:

a connecting module, configured to establish the connection with the public device;

a third acquiring module, configured to acquire a hardware identification corresponding to the public device;

a second sending module, configured to send the hardware identification to the server;

a first receiving module, configured to receive the device identification that is returned by the server according to the hardware identification; and a third sending module, configured to send the device identification to the public device, so that the public device stores the device identification and finishes registration on the server.

As an optional embodiment, the apparatus further includes:

a fourth acquiring module, configured to acquire first online account information corresponding to a logged-in first online account; and a fourth sending module, configured to send the first online account information to the server, so that the server creates the public online account that is corresponding to the device identification and includes the first online account according to the first online account information.

As an optional embodiment, the apparatus further includes:

a fifth acquiring module, configured to acquire device information and public online account information by using the first online account; and a fifth sending module, configured to send the device information and the public online account information to the server, so that the server stores the public online account information corresponding to the created public online account according to the first online account information, the device information, and the public online account information.

As an optional embodiment, the apparatus further includes:

a second receiving module, configured to receive the public online account information corresponding to the device identification returned by the server;

a sixth acquiring module, configured to acquire updated public online account information according to the public online account information corresponding to the device identification returned by the server; and a sixth sending module, configured to send the updated public online account information to the server, so that the server updates the public online account information corresponding to the public online account according to the updated public online account information.

As an optional embodiment, the apparatus further includes:

a third receiving module, configured to receive, in real time, first device use information that is sent by the public device and corresponding to the first online account; and a seventh sending module, configured to send the first device use information to the server, so that the server stores the first device use information and generates and updates public device use information according to the first device use information.

As an optional embodiment, the apparatus further includes:

a fourth receiving module, configured to receive, in real time, second device use information that is sent by the public device and corresponding to the second online account; and an eighth sending module, configured to send the second device use information to the server, so that the server stores the second device use information and updates the public device use information according to the second device use information.

Through the apparatus provided in the embodiments of the present invention, by acquiring a device identification of a public device corresponding to a public online account including at least a first online account and second online account information corresponding to a logged-in second online account, sending the device identification and the second online account information to the server, and associating, by the server, the second online account with the first online account in the public online account corresponding to the device identification, to obtain a public online account including the first online account and the second online account, the association between the first online account and the second online account is implemented, the process of associating online accounts is simplified, and the efficiency of associating online accounts is improved.

Figure 15:
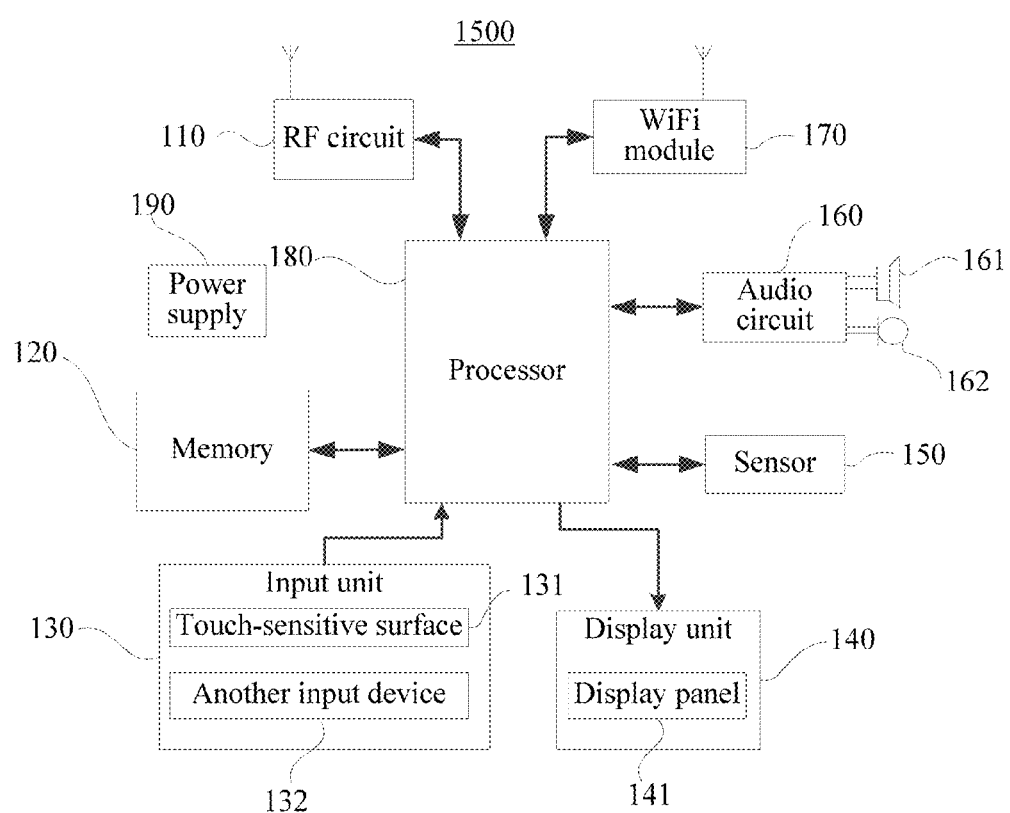
FIG. 15 is a schematic structural diagram of a terminal provided in another embodiment of the present invention.

The embodiments of the present invention provide a terminal. Referring to FIG. 15, which shows a schematic structural diagram of the terminal involved in the embodiments of the present invention. The terminal may be configured to implement the method for associating online accounts provided in the foregoing embodiments. Specifically:

A terminal 1500 may include components such as a radio frequency (RF) circuit 110, a memory 120 including one or more computer readable storage media, an input unit 130, a display unit 140, a sensor 150, an audio circuit 160, a WiFi module 170, a processor 180 including one or more processing cores, and a power supply 190. It should be understood by a person skilled in the art that the structure of the terminal shown in FIG. 15 does not constitute a limitation to the terminal, and the terminal may include more components or fewer components than those shown in the figure, or some components may be combined, or a different component deployment may be used. Where:

The RF circuit 110 may be configured to receive and send signals during an information receiving and sending process or a call process. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1500, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 1500. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 15, the touch-sensitive surface 131 and the display panel 141 are used as two separate parts to implement input and output functions, in some embodiments, the touch-sensitive surface 131 and the display panel 141 may be integrated to implement the input and output functions.

The terminal 1500 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 1500 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1500, are not further described herein.

The audio circuit 160, a loudspeaker 161, and a microphone 162 may provide audio interfaces between the user and the terminal 1500. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1500.

WiFi is a short distance wireless transmission technology. The terminal 1500 may help, by using the WiFi module 170, the user to receive and send e-mails, browse a webpage, access streaming media, and so on, which provides wireless broadband Internet access for the user. Although FIG. 15 shows the WiFi module 170, it may be understood that the WiFi module is not a necessary component of the terminal 1500, and when required, the WiFi module may be omitted as long as the scope of the essence of the present disclosure is not changed.

The processor 180 is the control center of the terminal 1500, and is connected to various parts of the mobile phone by using various interfaces and lines. By running or executing the software program and/or module stored in the memory 120, and invoking data stored in the memory 120, the processor 180 performs various functions and data processing of the terminal 1500, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 1500 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 1500 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and configured to be executed by one or more processors. The one or more programs contain instructions used for implementing the following operations:

acquiring a device identification of a public device that has established a connection, where the public device is a device that has registered on a server, and the public device is corresponding to a public online account including at least a first online account;

acquiring second online account information corresponding to a logged-in second online account; and sending the device identification and the second online account information to the server, so that the server associates the second online account with the first online account in the public online account corresponding to the device identification, to obtain a public online account including the first online account and the second online account.

Assuming the above is a first possible implementation, in a second possible implementation provided on the basis of the first possible implementation, the memory of the terminal further includes instructions for executing the following operations:

Before acquiring the device identification of the public device that has established the connection, the method further includes:

establishing the connection with the public device and acquiring a hardware identification of the public device;

sending the hardware identification to the server;

receiving the device identification that is returned by the server according to the hardware identification; and sending the device identification to the public device, so that the public device stores the device identification and finishes registration on the server.

In a third possible implementation provided on the basis of the second possible implementation, the memory of the terminal further includes instructions for executing the following operations:

After sending the device identification to the public device, the method further includes:

acquiring first online account information corresponding to a logged-in first online account; and sending the first online account information to the server, so that the server creates the public online account that is corresponding to the device identification and includes the first online account according to the first online account information.

In a fourth possible implementation provided on the basis of the third possible implementation, the memory of the terminal further includes instructions for executing the following operations:

After sending the first online account information to the server, the method further includes:

acquiring device information and public online account information by using the first online account and sending the device information and the public online account information to the server, so that the server stores the public online account information corresponding to the created public online account according to the first online account information, the device information, and the public online account information.

In a fifth possible implementation provided on the basis of the fourth possible implementation, the memory of the terminal further includes instructions for executing the following operations:

After sending the device identification and the second online account information to the server, the method further includes:

receiving the public online account information corresponding to the device identification returned by the server; and acquiring updated public online account information according to the public online account information corresponding to the device identification returned by the server and sending the updated public online account information to the server, so that the server updates the public online account information corresponding to the public online account according to the updated public online account information.

In a sixth possible implementation provided on the basis of the third possible implementation, the memory of the terminal further includes instructions for executing the following operations:

After sending the first online account information to the server, the method further includes:

receiving, in real time, first device use information that is sent by the public device and corresponding to the first online account; and sending the first device use information to the server, so that the server stores the first device use information and generates and updates public device use information according to the first device use information.

In a seventh possible implementation provided on the basis of the sixth possible implementation, the memory of the terminal further includes instructions for executing the following operations:

After sending the device identification and the second online account information to the server, the method further includes:

receiving, in real time, second device use information that is sent by the public device and corresponding to the second online account; and sending the second device use information to the server, so that the server stores the second device use information and updates the public device use information according to the second device use information.

Through the terminal provided in the embodiments of the present invention, by acquiring a device identification of a public device corresponding to a public online account including at least a first online account and second online account information corresponding to a logged-in second online account, sending the device identification and the second online account information to the server, and associating, by the server, the second online account with the first online account in the public online account corresponding to the device identification, to obtain a public online account including the first online account and the second online account, the association between the first online account and the second online account is implemented, the process of associating online accounts is simplified, and the efficiency of associating online accounts is improved.

The embodiments of the present invention further provide a computer readable storage medium. The computer readable storage medium may be the computer readable storage medium included in the memory in the embodiments; or may also be a computer readable storage medium exists individually and is not installed in a terminal. The computer readable storage medium stores one or more programs. The one or more programs are used by one or more processors for executing a method for associating online accounts. The method includes:

acquiring a device identification of a public device that has established a connection, where the public device is a device that has registered on a server, and the public device is corresponding to a public online account including at least a first online account;

acquiring second online account information corresponding to a logged-in second online account; and sending the device identification and the second online account information to the server, so that the server associates the second online account with the first online account in the public online account corresponding to the device identification, to obtain a public online account including the first online account and the second online account.

Assuming the above is a first possible implementation, in a second possible implementation provided on the first possible implementation, the memory of the terminal further includes instructions for executing the following operations:

Before acquiring the device identification of the public device that has established the connection, the method further includes:

establishing the connection with the public device and acquiring a hardware identification of the public device;

sending the hardware identification to the server;

receiving the device identification that is returned by the server according to the hardware identification; and sending the device identification to the public device, so that the public device stores the device identification and finishes registration on the server.

In a third possible implementation provided on the basis of the second possible implementation, the memory of the terminal further includes instructions for executing the following operations:

After sending the device identification to the public device, the method further includes:

acquiring first online account information corresponding to a logged-in first online account; and sending the first online account information to the server, so that the server creates the public online account that is corresponding to the device identification and includes the first online account according to the first online account information.

In a fourth possible implementation provided on the basis of the third possible implementation, the memory of the terminal further includes instructions for executing the following operations:

After sending the first online account information to the server, the method further includes:

acquiring device information and public online account information by using the first online account and sending the device information and the public online account information to the server, so that the server stores the public online account information corresponding to the created public online account according to the first online account information, the device information, and the public online account information.

In a fifth possible implementation provided on the basis of the fourth possible implementation, the memory of the terminal further includes instructions for executing the following operations:

After sending the device identification and the second online account information to the server, the method further includes:

receiving the public online account information corresponding to the device identification returned by the server; and acquiring updated public online account information according to the public online account information corresponding to the device identification returned by the server and sending the updated public online account information to the server, so that the server updates the public online account information corresponding to the public online account according to the updated public online account information.

In a sixth possible implementation provided on the basis of the third possible implementation, the memory of the terminal further includes instructions for executing the following operations:

After sending the first online account information to the server, the method further includes:

receiving, in real time, first device use information that is sent by the public device and corresponding to the first online account; and sending the first device use information to the server, so that the server stores the first device use information and generates and updates public device use information according to the first device use information.

In a seventh possible implementation provided on the basis of the sixth possible implementation, the memory of the terminal further includes instructions for executing the following operations:

After sending the device identification and the second online account information to the server, the method further includes:

receiving, in real time, second device use information that is sent by the public device and corresponding to the second online account; and sending the second device use information to the server, so that the server stores the second device use information and updates the public device use information according to the second device use information.

In the computer readable storage medium provided in the embodiments of the present invention, by acquiring a device identification of a public device corresponding to a public online account including at least a first online account and second online account information corresponding to a logged-in second online account, sending the device identification and the second online account information to the server, and associating, by the server, the second online account with the first online account in the public online account corresponding to the device identification, to obtain a public online account including the first online account and the second online account, the association between the first online account and the second online account is implemented, the process of associating online accounts is simplified, and the efficiency of associating online accounts is improved.

The embodiments of the present invention provide a graphical user interface. The graphical user interface is used in a first terminal. The terminal includes a touch screen display, a memory, and one or more processors for executing one or more programs. The graphical user interface includes:

acquiring a device identification of a public device that has established a connection, where the public device is a device that has registered on a server, and the public device is corresponding to a public online account including at least a first online account;

acquiring second online account information corresponding to a logged-in second online account; and sending the device identification and the second online account information to the server, so that the server associates the second online account with the first online account in the public online account corresponding to the device identification, to obtain a public online account including the first online account and the second online account.

Through the graphical user interface provided in the embodiments of the present invention, by acquiring a device identification of a public device corresponding to a public online account including at least a first online account and second online account information corresponding to a logged-in second online account, sending the device identification and the second online account information to the server, and associating, by the server, the second online account with the first online account in the public online account corresponding to the device identification, to obtain a public online account including the first online account and the second online account, the association between the first online account and the second online account is implemented, the process of associating online accounts is simplified, and the efficiency of associating online accounts is improved.

It should be noted that the above functional modules are only described for exemplary purposes when the apparatus for associating online accounts provided by the foregoing embodiments associate the online accounts. In actual applications, the functions may be allocated to different functional modules according to specific needs, which means that the internal structure of the apparatus is divided to different functional modules to complete all or some of the above described functions. In addition, the apparatus for associating online accounts provided in the foregoing embodiments is based on the same concept as the method for associating online accounts provided by the method embodiments. For the specific implementation process, refer to the method embodiments, and the details are not described herein again.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for associating online accounts, for associating a first online account and a second online account, comprising:
   at a computing device having one or more processors and memory storing programs executed by the one or more processors;
   acquiring a device identification of a public device that has established a connection, the public device being a device that has registered on a server, and the public device being corresponding to a public online account, which comprises a first online account and a second online account;
   acquiring second online account information corresponding to a logged-in second online account; and
   sending the device identification and the second online account information to the server, so that the server associates the second online account with the first online account in the public online account corresponding to the device identification, to obtain a public online account comprising the first online account and the second online account.

2. The method according to claim 1, wherein before the acquiring a device identification of a public device that has established a connection, the method further comprises:
   establishing the connection with the public device and acquiring a hardware identification of the public device;
   sending the hardware identification to the server;
   receiving the device identification that is returned by the server according to the hardware identification; and
   sending the device identification to the public device, so that the public device stores the device identification and finishes registration on the server.

3. The method according to claim 2, wherein after the sending the device identification to the public device, the method further comprises:
   acquiring first online account information corresponding to a logged-in first online account; and
   sending the first online account information to the server, so that the server creates the public online account that is corresponding to the device identification and comprises the first online account according to the first online account information.

4. The method according to claim 3, wherein after the sending the first online account information to the server, the method further comprises:
   acquiring device information and public online account information by using the first online account and sending the device information and the public online account information to the server, so that the server stores the public online account information corresponding to the created public online account according to the first online account information, the device information, and the public online account information.

5. The method according to claim 4, wherein after the sending the device identification and the second online account information to the server, the method further comprises:
   receiving the public online account information corresponding to the device identification returned by the server; and
   acquiring updated public online account information according to the public online account information corresponding to the device identification returned by the server and sending the updated public online account information to the server, so that the server updates the public online account information corresponding to the public online account according to the updated public online account information.

6. The method according to claim 3, wherein after the sending the first online account information to the server, the method further comprises:
   receiving, in real time, first device use information that is sent by the public device and corresponding to the first online account; and
   sending the first device use information to the server, so that the server stores the first device use information and generates and updates public device use information according to the first device use information.

7. The method according to claim 6, wherein after the sending the device identification and the second online account information to the server, the method further comprises:
   receiving, in real time, second device use information that is sent by the public device and corresponding to the second online account; and
   sending the second device use information to the server, so that the server stores the second device use information and updates the public device use information according to the second device use information.

8. An apparatus for associating online accounts, configured to associating a first online account and a second online account, comprising a plurality of program modules comprising computer-implemented instructions stored in memory of a computing device and executed by one or more processors of the computing device, the plurality program modules comprising:
   a first acquiring module, configured to acquire a device identification of a public device that has established a connection, the public device being a device that has registered on a server, and the public device being corresponding to a public online account comprising at least a first online account;

a second acquiring module, configured to acquire second online account information corresponding to a logged-in second online account; and a first sending module, configured to send the device identification and the second online account information to the server, so that the server associates the second online account with the first online account in the public online account corresponding to the device identification, to obtain a public online account comprising the first online account and the second online account.

9. The apparatus according to claim 8, wherein the apparatus further comprises:

a connecting module, configured to establish the connection with the public device;

a third acquiring module, configured to acquire a hardware identification corresponding to the public device;

a second sending module, configured to send the hardware identification to the server;

a first receiving module, configured to receive the device identification that is returned by the server according to the hardware identification; and a third sending module, configured to send the device identification to the public device, so that the public device stores the device identification and finishes registration on the server.

10. The apparatus according to claim 9, wherein the apparatus further comprises:

a fourth acquiring module, configured to acquire first online account information corresponding to a logged-in first online account; and a fourth sending module, configured to send the first online account information to the server, so that the server creates the public online account that is corresponding to the device identification and comprises the first online account according to the first online account information.

11. The apparatus according to claim 10, wherein the apparatus further comprises:

a fifth acquiring module, configured to acquire device information and public online account information by using the first online account; and a fifth sending module, configured to send the device information and the public online account information to the server, so that the server stores the public online account information corresponding to the created public online account according to the first online account information, the device information, and the public online account information.

12. The apparatus according to claim 11, wherein the apparatus further comprises:

a second receiving module, configured to receive the public online account information corresponding to the device identification returned by the server;

a sixth acquiring module, configured to acquire updated public online account information according to the public online account information corresponding to the device identification returned by the server; and a sixth sending module, configured to send the updated public online account information to the server, so that the server updates the public online account information corresponding to the public online account according to the updated public online account information.

13. The apparatus according to claim 10, wherein the apparatus further comprises:

a third receiving module, configured to receive, in real time, first device use information that is sent by the public device and corresponding to the first online account; and a seventh sending module, configured to send the first device use information to the server, so that the server stores the first device use information and generates and updates public device use information according to the first device use information.

14. The apparatus according to claim 13, wherein the apparatus further comprises:

a fourth receiving module, configured to receive, in real time, second device use information that is sent by the public device and corresponding to the second online account; and an eighth sending module, configured to send the second device use information to the server, so that the server stores the second device use information and updates the public device use information according to the second device use information.

* * * * *